United States Patent [19]

Ohmura

[11] Patent Number: 4,953,650
[45] Date of Patent: Sep. 4, 1990

[54] REAR WHEEL STEERING CONTROL SYSTEM

[75] Inventor: Hiroshi Ohmura, Higashi-Hiroshima, Japan

[73] Assignee: Mazda Motor Company, Hiroshima, Japan

[21] Appl. No.: 322,502

[22] Filed: Mar. 13, 1989

[30] Foreign Application Priority Data

Mar. 14, 1988 [JP] Japan ............................ 63-58251

[51] Int. Cl.⁵ .................... B62D 7/14; B62D 5/04
[52] U.S. Cl. ....................... 180/79.1; 180/140; 364/424.01
[58] Field of Search ............... 180/79.1, 140, 234; 280/91; 364/424.01

[56] References Cited

U.S. PATENT DOCUMENTS

| 4,645,025 | 2/1987 | Ohe et al. | |
| 4,770,264 | 9/1988 | Wright et al. | 180/140 |
| 4,799,566 | 1/1989 | Shimizu | 180/79.1 |

FOREIGN PATENT DOCUMENTS

| 61-175183 | 8/1986 | Japan | 180/140 |
| 62-25277 | 2/1987 | Japan | . |
| 62-160965 | 7/1987 | Japan | 180/140 |
| 8804251 | 6/1988 | World Int. Prop. O. | 180/79.1 |

*Primary Examiner*—Charles A. Marmor
*Assistant Examiner*—Alan M. Kagen
*Attorney, Agent, or Firm*—Fleit, Jacobson, Cohn, Price, Holman & Stern

[57] ABSTRACT

A rear wheel steering control system comprising a rear wheel steering mechanism, drive motor connected with said rear wheel steering mechanism for actuating the same, target setting means for setting a target steering angle of the rear wheels in accordance with a predetermined factor, motor control unit for controlling said drive motor so as to accomplish the target steering angle of the rear wheels, lock device for preventing the rear wheel steering mechanism from any steering movement when the target steering angle is substantially constant, release device for releasing the lock device to allow the steering movement of the rear wheel steering mechanism even when the target steering angle of the rear wheels is substantially constant under a predetermined condition, the control system is responsive in controlling the steering of the vehicle.

15 Claims, 6 Drawing Sheets

REAR WHEEL STEERING CONTROL SYSTEM

BACKGROUND OF THE INVENTION

1. Field of the invention

The present invention relates to a rear wheel steering control system for an automotive vehicle, more specifically to a steering control for rear wheels of a four wheel steering vehicle.

2. Description of the prior art

In a field of automotive vehicles, there has been known a four wheel steering system in which rear wheels are steered as well as front wheels thereof. One of the four wheel steering systems is a mechanical system in which a front wheel steering mechanism is functionally and mechanically connected with a rear wheel steering mechanism. The other is known as an electrical steering system in which the rear wheel steering mechanism is provided with a drive motor for driving the rear steering mechanism as shown in Japanese Utility Model public disclosure No. 62-25277 laid open to the public on Feb. 16, 1987. U.S. Pat. No. 4,645,025 discloses another electrical rear wheel steering system with an electric motor for driving the rear wheel steering system. The electrical rear wheel steering system disclosed in the Japanese publication is provided with a speed reduction mechanism between the motor and the rear wheel steering mechanism so as to reduce a capacity of the motor.

In a steering control, it is desirable that the rear wheels are prevented from steering under a certain condition such as a constant vehicle speed and a constant steering angle for steering wheel. For this purpose, so called servo lock system has been known in which a power is supplied for a servo motor for driving the rear steering mechanism so as to maintain a constant rotative position thereof and thereby to keep a constant steering angle of the rear wheels. The Japanese publication discloses a motor brake device for locking the motor as the steering lock system so that the rear wheel steering mechanism is locked to maintain a steering angle of the rear wheels at a constant value when the motor brake device is actuated. The motor brake device is actuated to lock the rear wheel steering mechanism when a vehicle speed and the steering angle of a steering wheel are constant. This steering lock system of the rear wheel steering system employing the above motor brake device is advantageous in that an electric power consumption can be remarkably reduced in comparison with the servo lock system. As a result, a durability of the motor can be improved.

However, it has been found that such steering lock systems are not responsive in a control of the steering angle of the rear wheels under a certain vehicle operating condition, because the motor cannot be actuated to change the steering angle of the rear wheels until the steering lock systems are released even when a steering angle control of the rear wheels is desired. Thus, the conventional steering lock system cannot satisfy a request for a quick responsiveness in the rear wheel steering control.

SUMMARY OF THE INVENTION

It is therefore an object of the present invention to provide a responsive rear wheel steering control system.

It is another object of the present invention to provide a rear wheel steering control system which can lock the rear wheel steering mechanism securely when it is desired.

The above and other objects of the present invention can be accomplished by a rear wheel steering control system comprising a rear wheel steering mechanism for steering rear wheels of a vehicle, drive motor means connected with said rear wheel steering mechanism for actuating the same, target setting means for setting a target steering angle of the rear wheels in accordance with a predetermined factor, motor control means for controlling said drive motor so as to accomplish the target steering angle of the rear wheels, lock means for preventing the rear wheel steering mechanism from any steering movement when the target steering angle of the rear wheels is substantially constant, release means for releasing the lock means to allow the steering movement of the rear wheel steering mechanism even when the target steering angle of the rear wheels is substantially constant under a predetermined condition.

When the vehicle runs in a high speed, it is desirable to get a quick response in a steering control. For this purpose, the release means is actuated to release the lock means or revoke the steering lock operation of the lock means in a high vehicle speed condition so that the rear wheel steering mechanism is allowed to move to a position in which the target steering angle of the rear wheel is obtained.

In most four wheel steer vehicles in which the steering angle of the rear wheels is determined in accordance with that of the front wheels taking account of the vehicle speed, the steering angle of the rear wheels is steered in the same direction as the front wheels is steered (same phase) as the vehicle speed is increased in order to get a driving stability. In such a four wheel steer vehicle, it is also critical to get a responsive rear wheel steering control. In view of the above, the lock means is preferably released to revoke the steering lock operation thereof when an acceleration of the vehicle is detected.

In a decelerating condition of the vehicle, the lock means may be also released.

In addition, when a hunting is likely to occur in detecting various factors for determining the target steering angle of the rear wheels, the lock means may be released.

The above and other features of the present invention will be apparent from the following description taking reference to the accompanying drawings.

DESCRIPTION OF THE PREFERRED EMBODIMENT

Figure 1:
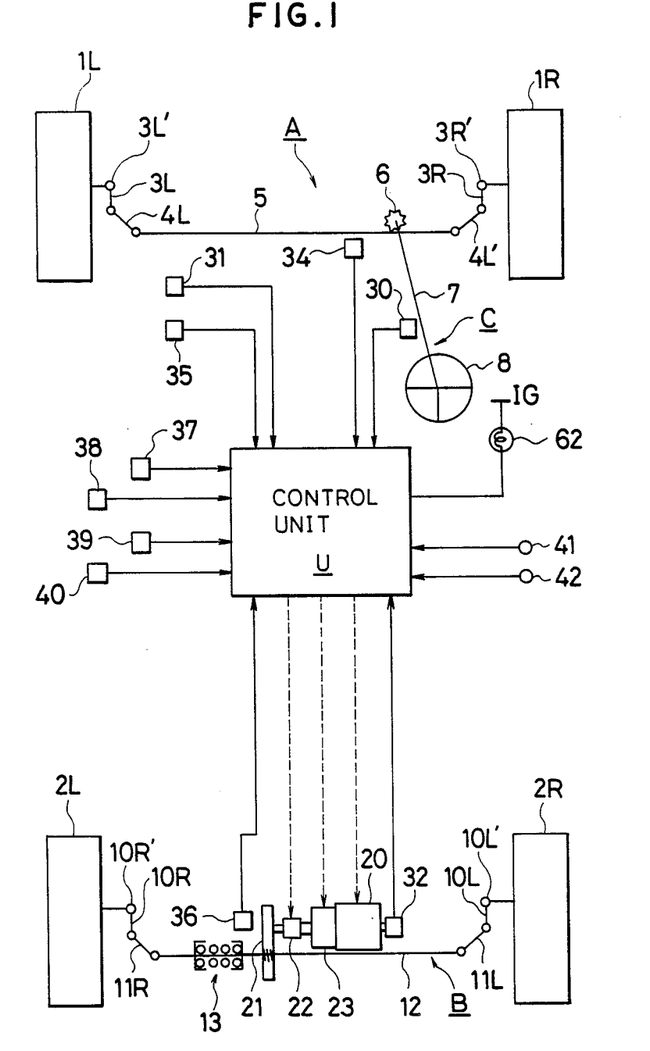
FIG. 1 is a schematic view of a steering control system in accordance with a preferred embodiment of the present invention.

Referring to the drawings, specifically to FIG. 1 in which a schematic view of a four wheel steering system is illustrated, the system is provided with a front wheel steering mechanism A for steering a right and left front wheels 1R and 1L, and a rear wheel steering mechanism B for steering a right and left rear wheels 2R and 2L.

The front wheel steering mechanism A is provided with a pair of knuckle arms 3R and 3L, tie rods 4R, 4L and a relay rod 5 for connecting the tie rods 4R and 4L. To the front wheel steering mechanism A is connected a steering mechanism C of a rack and pinion type of which pinion 6 is connected with a steering wheel 8 through a steering column 7 wherein a clockwise operation of the steering wheel causes the relay rod to move leftward in FIG. 1 so that the knuckle arms 3R and 3L rotate clockwise around rotation centers 3R' and 3L' respectively to cause the front wheels 1R and 1L to be steered rightward in FIG. 1 by an amount corresponding to an amount of the rotative movement of the steering wheel 8. Likewise, when the steering wheel 8 is steered counterclockwise, the front wheels 1R and 1L are steered rightward leftward.

Figure 3:
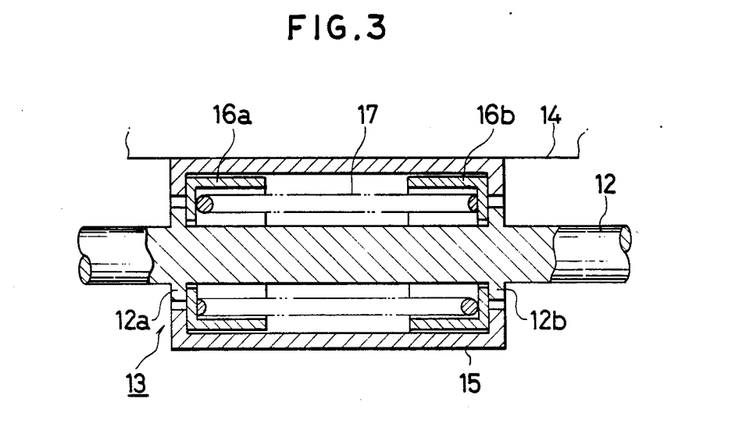
FIG. 3 is a sectional view of a lock device.

The rear wheel steering mechanism B is provided with a pair of right and left knuckle arms 10R and 10L, tie rods 11R and 11L, and a relay rod 12 which connects the tie rods 11R and 11L with each other. The relay rod 12 is provided with a neutralizing device 13. The neutralizing device 13 as shown in FIG. 3 is provided with a casing mounted on a vehicle body 14, a pair of spring seats 16a, 16b disposed in the casing and a spring 17 between the seats 16a, 16b. The relay rod 12 is extended through the casing 15 and formed with a pair of flange portions 12a, 12b which carry the seats 16a, 16b so that the relay rod 12 is urged to be positioned at a neutral position. A resilient force of the spring 17 can overcome a side force acting on the vehicle in a cornering operation of the vehicle so that the side force does not affect the position of the relay rod 12.

Figure 2:
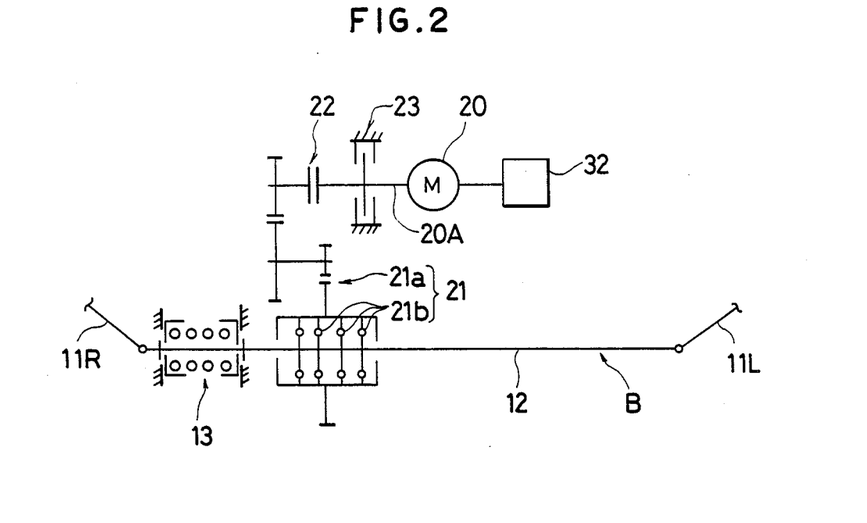
FIG. 2 is a skeleton of a rear wheel steering mechanism.

The rear wheel steering mechanism B is connected with a DC servo motor 20 for steering the rear wheels 2R, 2L. Specifically, as shown in FIG. 2, the relay rod 12 is connected with the servo motor 20 through a speed reduction mechanism 21 including a gear train 21a and screws 21b, a clutch 22 and a magnetic motor brake mechanism 23 so that the servo motor 20 can be disengaged from the rear wheel steering mechanism B by means of the clutch 22 at any time. The motor brake mechanism 23 can be engaged with an output shaft 20A of the servo motor 20 to stop a rotative movement of the output shaft.

As a result, when the clutch 22 is engaged, a normal and reverse rotation of the servo motor 20 causes the relay rod 12 to move axially rightward and leftward so that the knuckle arms 10R, 10L or the rear wheels 2R, 2L are steered clockwise and counterclockwise around rotation centers 10R', 10L' in accordance with an amount of the rotation of the servo motor 20.

On the other hand, when the clutch 22 is disengaged, the rear wheels are forced to be positioned at the neutral position by virtue of the neutralizing device 13. In this case, only the front wheels are steered as if a two wheel steer vehicle.

Figure 4:
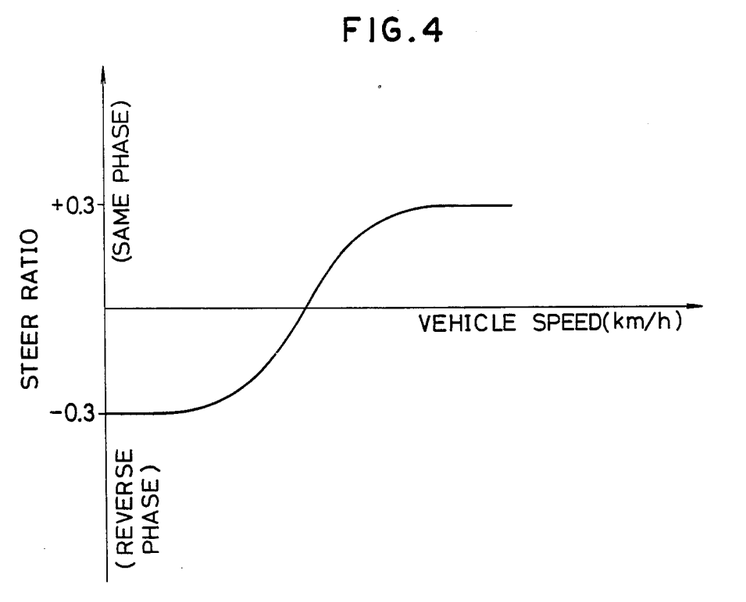
FIG. 4 is a graphical representation showing a control property of a steering ratio between the front and rear wheel steering angles taking account of the vehicle speed.
Figure 5:
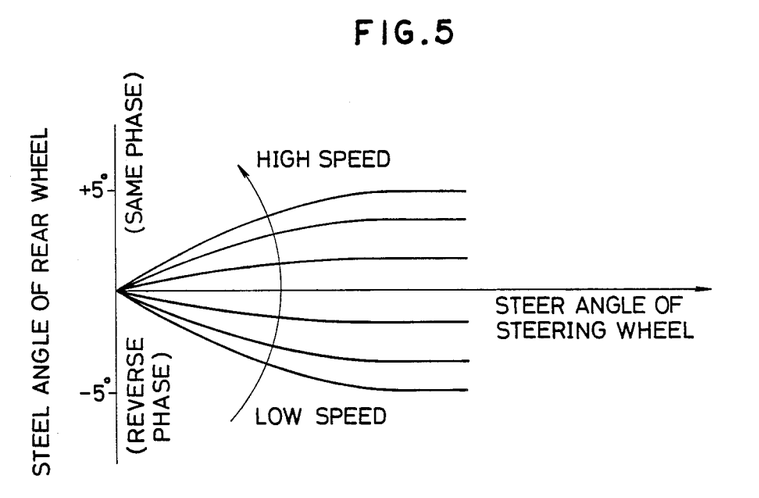
FIG. 5 is a graphical representation showing a change in a rear wheel steering angle in accordance with the vehicle speed.

In this embodiment, the steering angle control for the rear wheels is made taking account of the vehicle speed. For example, the control is carried out so as to obtain a steering ratio property as shown in FIG. 4. In this control, as the vehicle speed is increased, the steering angle of the rear wheels is changed from a reverse phase in which the rear wheels are steered in a direction opposite to that of the front wheels to a same phase in which the rear wheels are steered in the same direction as the front wheels. In this case, the steering angle of the rear wheels 2R, 2L changes as shown in FIG. 5 in accordance with the vehicle speed and the steering angle of the steering wheel 8.

In order to accomplish the steering control of the illustrated embodiment, the control system is provided with an electronic control unit U. The control unit U receives signals from a steering angle sensor 30 for detecting the steering angle of the steering wheel 8, a vehicle speed sensor 31 for detecting the vehicle speed, an encoder 32 for detecting a rotative position of the servo motor 20, determines the target steering angle of the rear wheels 2R, 2L based on the steering angle of the steering wheel 8 and the vehicle speed and produces a control signal for the servo motor 20. The encoder 32 detects the rotative position of the servo motor 20 to accomplish a feedback control of the steering angle control for the rear wheels 2R, 2L. The control unit U receives a signal from a throttle senor 42 for detecting a throttle opening to thereby detect a request of an acceleration and deceleration for the vehicle. This system is constituted by a twin structure for obtaining a fail safe function. Namely, the system is provided with a front wheel steering angle sensor 34 for detecting a steering angle of the front wheels 1R, 1L in addition to the steering sensor 30 of the steering wheel 8, a rear wheel steering angle sensor 36 for detecting a displacement in the vicinity of the relay rod 12 in addition to the encoder 32 so that the steering control for the rear wheels 2R, 2L is carried out only when the signals from each of the sensors are substantially identical. For instance, when a vehicle speed obtained through the first vehicle speed sensor 31 is not considered as identical with that obtained through a second vehicle speed sensor 35, the rear wheels 2R, 2L are maintained at the neutral position by virtue of a fail safe control.

Further, for the fail safe function of the control system, the control unit U receives ON-OFF signals from a neutral clutch switch 37 which produces ON signal when a neutral shift position is selected and a clutch is disengaged in the case of a manual transmission and otherwise produces OFF signal, an impedance switch 38 which produces ON signal when a shift position is in a neutral range and a parking range in the case of an automatic transmission and otherwise produces OFF signal, a brake switch 39 for producing ON signal when a brake pedal is operated for braking effect of the vehicle, an engine switch 40 for producing ON signal when engine is under operation, and a signal from a L terminal 41 of an alternator so as to detect an abnormality thereof.

Figure 6:
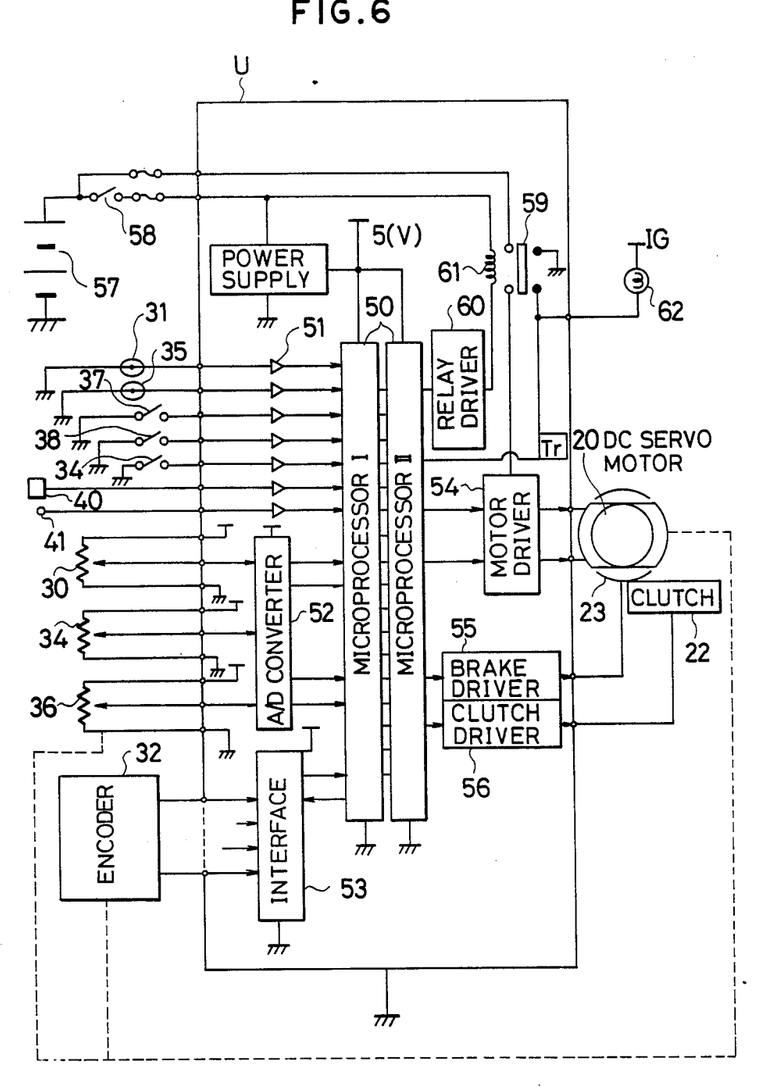
FIG. 6 is a block chart of a control system in accordance with a preferred embodiment.

Referring to FIG. 6 in addition to FIG. 1, the control unit U is provided with a microprocessor 50 including microprocessors I and II into which the signals from the vehicle speed sensors 31 and 35, the switches 37–40, and the L terminal 41 of the alternator are introduced through a buffer 51. The signals from the sensors 30, 34 and 36 are also introduced into the microprocessor 50 through an A/D converter 52. In addition, the signal from the encoder 32 is introduced into the microprocessor 50 through an interface 53. A control signal from the control unit U is introduced into the servo motor 20 through a drive circuit 54, into the clutch 22 through a drive circuit 56 and into the motor brake mechanism 23 through a drive circuit 55. The steering control for the rear wheels 2R, 2L is initiated when the signal from the L terminal 41 of the alternator is turned to Hi. There are provided a battery 57, an ignition key switch 58 and a relay 59 wherein a drive circuit 60 for the relay 59 is actuated to interrupt a power supply to a coil 61 when an abnormality occurs in the steering control system of the four wheel steer vehicle so that B contact of the relay 59 is closed to turn a warning lamp 62 on.

Hereinafter, there are described controls when an abnormality occurs.

Abnormality Control A

This control is carried out in the case where the steering control for the rear wheels 2R, 2L is available and the position of the wheels 2R, 2L can be detected. In this control, (1) the warning lamp 62 is turned on, thereafter (2) the rear wheels 2R, 2L are returned to the neutral positions thereof by means of the motor 20, and (3) the motor brake mechanism 23 is engaged to restrict any steering movement of the rear wheels 2R, 2L.

Abnormality Control B

This control is carried out in the case where the steering control for the rear wheels 2R, 2L and the steered position of the rear wheels 2R, 2L are not available.

In this control, (1) the warning lamp 62 is turned on and thereafter (2) the clutch 22 is disengaged so that the servo motor 20 is disengaged from the rear wheel steering mechanism B, then (3) the rear wheels 2R, 2L are returned to the neutral positions thereof by virtue of the resilient force of the neutralizing device 13. When the rear wheels 2R, 2L are returned to the neutral positions, (4) the clutch 22 is engaged to connect the servo motor 20 with the rear wheel steering mechanism B. Preferably, after the clutch 22 is disengaged in the above step (2), the motor brake mechanism 23 is engaged to stop the motor 20 at the instant. Thereafter, the power supply for the motor 20 is stopped.

Figure 7:
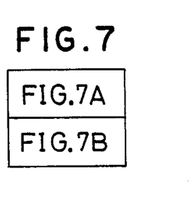
FIG. 7 is a flow chart of a steering control of a preferred embodiment.
Figure 7A:
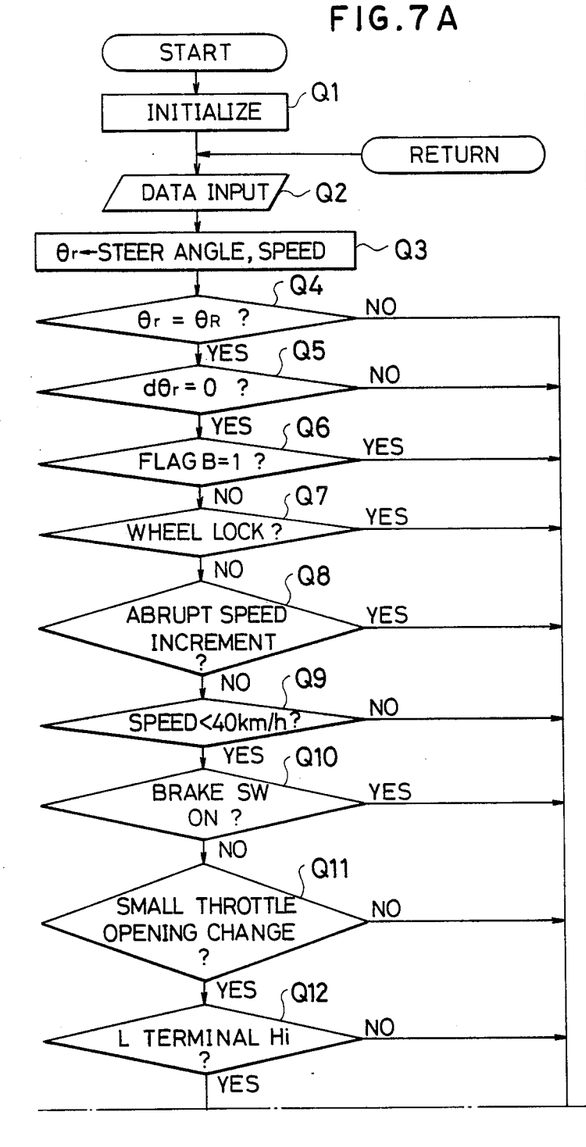
Figure 7B:
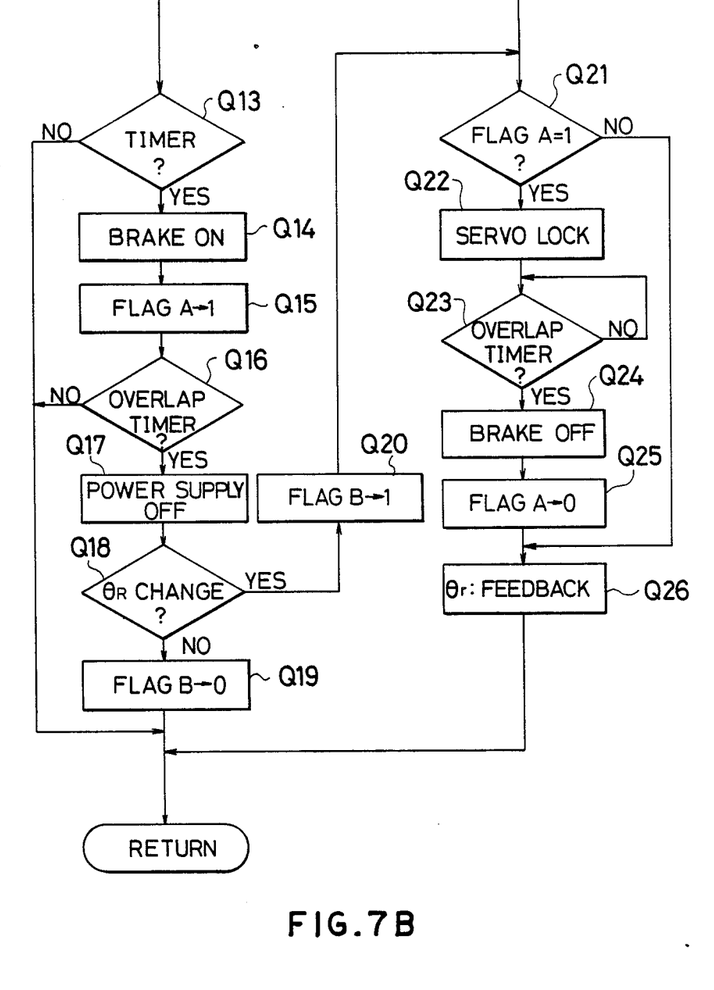

Hereinafter, there is described a steering control for the rear wheels 2R, 2L taking reference with a flow chart shown in FIG. 7.

First of all, the control unit U initializes the system (Q1). In step Q2, the control unit U reads signals from the various sensors. The control unit U determines a target steering angle θr of the rear wheels 2R, 2L based on the steering angle of the steering wheel 8 and the vehicle speed in light of the steering angle property shown in FIG. 5.

In the following steps Q4–Q14, it is judged whether or not the motor brake mechanism 23 should be actuated eventually.

In step Q4, the control unit U judges whether or not the target steering angle θr accords with an actual steering angle θR of the rear wheels 2R, 2L. When this judgement is Yes or θr=θR, one of conditions for actuating the brake mechanism 23 is satisfied.

In step Q5, the control unit U judges whether or not the target steering angle θr is not changed as a result of no steering operation in the steering wheel 8. When this judgment is Yes, or θr is not changed, one of the conditions is satisfied.

In step Q6, the control unit U judges whether or not a brake flag B for detecting an abnormality of the motor brake mechanism 23 takes a value of 1 wherein the value of 1 shows an abnormality of the brake mechanism 23. When this judgment is No or the flag B is 0, one of the conditions is satisfied.

In step Q7, it is judged whether or not the wheels specifically, the rear wheels 2R, 2L are in a wheel lock condition. This judgment is made based on a change in the vehicle speed under a braking condition of the vehicle. For instance, when the vehicle speed is more than 30 km/h at the time of the preceding sampling and zero in the current sampling and the brake switch 39 is on, it is judged that the vehicle is in the wheel lock condition. If the motor brake mechanism 23 is actuated under the wheel lock condition, it will be difficult to carry out the responsive steering control when the steering wheel 8 is steered again. Therefore, the motor brake mechanism 23 is not actuated when the wheel lock condition occurs.

In step Q8, the control unit U judges whether or not the vehicle speed is abruptly increased. This abrupt increase may be caused by a chattering of the vehicle speed sensor 31 and 35. Even when the vehicle speed is converged at a high value temporarily, this value does not mean an actual speed in many cases so that the motor brake mechanism 23 is not actuated in this control even though the other conditions allow the motor brake mechanism 23 to be actuated. In step Q9, the control unit U judges whether or not the vehicle speed is less than 40 km/h. In the illustrated embodiment, the rear wheels 2R, 2L are steered in the same phase when the vehicle speed increased beyond about 40 km/h as shown in FIG. 5. When this Judgment is Yes, one of the conditions is satisfied. This critical vehicle speed can be changed in view of a control responsiveness.

In step Q10, the control unit U judges whether or not the vehicle is in a deceleration or the brake switch 39 is on. In many cases, an abrupt deceleration accompanies an abrupt change in the target steering angle θr. Therefore, when the brake switch 39 is off, one of the conditions for actuating the motor brake mechanism 23 is satisfied.

In step 11, it is judged whether or not a change in the throttle opening is less than a predetermined value in order to detect a request for an acceleration and a deceleration of the vehicle. When this judgment is Yes, one of the conditions is satisfied.

In step Q12, the control unit U judges whether or not the signal from the L terminal 41 of the alternator is Hi. This judgment is Yes, one of the conditions is satisfied. When the signal is Lo, a reference position of the motor 20 is adjusted for the encoder 32. This is because if the motor brake mechanism 23 is actuated during an engine strike wherein the signal is Lo, a delay occurs in adjusting the reference position resulting in a slow response in the initiation of the steering control of the rear wheels 2R, 2L.

In the case where the conditions in steps Q4 through Q12 are satisfied, the following steps Q13 and Q14 are carried out.

Namely, the control unit U actuates the motor brake mechanism 23 to restrict the movement of the motor 20 (Q14) after the predetermined time period (0.5 second in this embodiment) elapsed (Q13). Thereafter, the control unit U sets a flag A at a value of 1 which shows that a steering lock control for the rear wheels 2R, 2L is carried out.

Then, the control unit U stops a power supply for making a servo lock of the servo motor 20 a predetermined time (0.1 second in this embodiment) after the motor brake mechanism 23 is turned on (Q16, Q17) so that the servo lock for the motor 20 and the operation of the motor brake mechanism 23 are overlapped by the predetermined time. As a result, a steering lock for the rear wheels can be smoothly switched from the servo lock to the magnetic lock by the motor brake mechanism 23.

In step Q18, the control unit U judges whether or not the actual steering angle ΘR is changed. When this judgment is Yes, the steering lock by the motor brake mechanism 23 is considered to be properly made. In this case, the control unit U sets the brake flag B at the value of 0 and returns to step Q2. Likewise the control unit U returns to step Q2 when the judgments are No at the steps Q13, Q16. Alternatively, the control unit U can stay the execution of the subsequent steps until the respective predetermined period has passed at the steps Q13, Q16.

When the judgment in step Q18 is No, this means that the steering lock by the motor brake mechanism 23 is improper. This is caused by such as an abnormality in the drive circuit for the motor brake mechanism 23, and a slippage in the motor brake mechanism 23. In this case, the control unit U goes to step Q21 after setting the flag B at the value of 1 in step Q20.

Steps Q21 through Q26 show a control in which the steering lock for the rear wheels 2R, 2L by the motor brake mechanism 23 is not carried out. This control is effected in the case where the motor brake mechanism 23 is in an abnormal condition, and at least one of the conditions in steps 4 through 12 is not satisfied.

In step Q21, it is judged whether or not the flag A is the value of 1. If the judgment is Yes, the control unit U supplies a power for the motor 20 to maintain the rotative position thereof for thereby effecting the servo lock (Q22). After a predetermined time elapsed (Q23), the control unit U disengage the motor brake mechanism 23 (Q24) and resets the flag A at the value of 0 (Q25). In step Q26, the control unit U drives the motor 20 to reach the target steering angle Θr by means of a feedback control. In this control, when the target steering angle Θr is obtained, the servo lock is effected.

The control property for the rear wheels can be provided not based on the vehicle speed but on the steering angle of the front wheels.

It will be apparent that various modifications and improvements may be made based on the above descriptions by those skilled in the art without departing from the scope of the claims as attached.

I claim:

1. A rear wheel steering control system comprising a rear wheel steering mechanism for steering rear wheels of a vehicle, drive motor means connected with said rear wheel steering mechanism for actuating the same, target setting means for setting a target steering angle of the rear wheels in accordance with a predetermined factor, motor control means for controlling said drive motor means so as to accomplish the target steering angle of the rear wheels, magnetic brake means for preventing the rear wheel steering mechanism from any steering movement when the target steering angle of the rear wheels is substantially constant, release means for releasing the magnetic brake means to allow the steering movement of the rear wheel steering mechanism under a predetermined condition even when the target steering angle of the rear wheels is substantially constant.

2. A rear wheel steering control system in accordance with claim 1 wherein the rear wheel steering mechanism is provided with a relay rod for connecting right and left tie rods of the rear wheels and power transmitting means for transmitting an output of the drive motor means to the relay rod.

3. A rear wheel steering control system in accordance with claim 2 wherein the power transmitting means is provided with clutch means for controlling a transmission of the output of the drive motor.

4. A rear wheel steering control system in accordance with claim 3 wherein the power transmitting means is provided with speed reduction means for reducing a speed transmitted to the relay rod.

5. A rear wheel steering control system in accordance with claim 1 wherein the rear wheel steering mechanism is provided with a neutralizing means for returning and retaining the rear wheels at neutral positions.

6. A rear wheel steering control system in accordance with claim 5 wherein the neutralizing means is provided with a pair of spring seats and a spring disposed between the spring seats.

7. A rear wheel steering control system in accordance with claim 1 wherein the drive motor means comprises a DC servo motor.

8. A rear wheel steering control system in accordance with claim 1 wherein the rear wheel steering mechanism is further provided with steering angle detecting means for detecting a steering angle of a steering wheel, and speed detecting means for detecting a vehicle speed, the target setting means being adapted to set the target steering angle of the rear wheels based on the steering angle of the steering wheel and the vehicle speed.

9. A rear wheel steering control system in accordance with claim 8 wherein said steering angle detecting means is provided with a steering wheel steering angle sensor for detecting a rotation angle of a steering column connected with the steering wheel and a front wheel steering angle sensor for detecting a reduction means for reducing a speed transmitted to the relay rod.

10. A rear wheel steering control system in accordance with claim 8 wherein said speed detecting means is provided with a first vehicle speed sensor and a second speed sensor which detect the vehicle speed independently.

11. A rear wheel steering control system in accordance with claim 1 wherein the rear wheel steering mechanism is further provided with rotative position detecting means for detecting a rotative position of the drive motor means, said motor control means controlling the drive motor by utilizing a signal from the motor position detecting means.

12. A rear wheel steering control system in accordance with claim 11 wherein the rotative position detecting means is provided with an encoder for detecting the rotative position of the drive motor and a rear wheel steering angle sensor for detecting a displacement of a relay rod for steering the rear wheels.

13. A rear wheel steering control system in accordance with claim 1 wherein the release means revokes a steering lock operation of the magnetic brake means against the rear wheel steering mechanism when a vehicle speed is more than a predetermined value.

14. A rear wheel steering control system in accordance with claim 1 wherein the release means revokes a locking operation of the magnetic brake means against the rear wheel steering mechanism when the vehicle acceleration is more than a predetermined value.

15. A rear wheel steering control system in accordance with claim 1 wherein the release means revokes a locking operation of the magnetic brake means against the rear wheel steering mechanism when the vehicle deceleration is more than a predetermined value.

* * * * *